United States Patent
Filipovic et al.

(10) Patent No.: US 8,099,072 B2
(45) Date of Patent: Jan. 17, 2012

(54) FREQUENCY CHANGER CIRCUITS

(75) Inventors: Daniel F. Filipovic, Solana Beach, CA (US); Inyup Kang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1003 days.

(21) Appl. No.: 11/562,393

(22) Filed: Nov. 21, 2006

(65) Prior Publication Data

US 2008/0119158 A1    May 22, 2008

(51) Int. Cl.
*H04B 1/10* (2006.01)
*H04B 1/26* (2006.01)

(52) U.S. Cl. ......... 455/296; 455/312; 455/313; 455/326

(58) Field of Classification Search ............... 455/296, 455/302, 303, 311, 312, 313, 326; 375/261, 375/324, 346, 351
See application file for complete search history.

(56) References Cited

U.S. PATENT DOCUMENTS

| | | | |
|---|---|---|---|
| 4,442,433 A | 4/1984 | Myers et al. | |
| 5,459,432 A | 10/1995 | White et al. | |
| 5,825,756 A | 10/1998 | Hattori | |
| 6,005,887 A * | 12/1999 | Bottomley et al. | 375/147 |
| 6,125,272 A * | 9/2000 | Bautista et al. | 455/326 |
| 6,490,326 B1 | 12/2002 | Bastani et al. | |
| 6,502,184 B1 | 12/2002 | Zhang et al. | |
| 6,574,459 B1 | 6/2003 | Kaminski et al. | |
| 6,683,919 B1 * | 1/2004 | Olgaard et al. | 375/316 |
| 6,931,241 B2 | 8/2005 | Khlat et al. | |
| 6,933,766 B2 * | 8/2005 | Khlat et al. | 327/359 |
| 6,959,179 B1 | 10/2005 | Wong et al. | |
| 6,978,358 B2 | 12/2005 | Francis | |
| 7,236,763 B2 * | 6/2007 | Heck | 455/323 |
| 7,251,468 B2 * | 7/2007 | Ruelke et al. | 455/296 |
| 7,356,324 B2 * | 4/2008 | Hammes et al. | 455/323 |

(Continued)

FOREIGN PATENT DOCUMENTS

DE    4003301    8/1991

(Continued)

OTHER PUBLICATIONS

International Search Report, PCT/US2007/085296—International Search Authority—European Patent Office—Nov. 4, 2008.

(Continued)

*Primary Examiner* — Duc M Nguyen
(74) *Attorney, Agent, or Firm* — Timothy F. Loomis

(57) ABSTRACT

In accordance with one aspect of the disclosure, apparatus are provided. A filter is provided to receive from an antenna a receive signal of a given type and a low noise amplifier is provided to amplify the received signal. A translator down translates the receive signal carried at a radio frequency to be carried at an intermediate frequency. An I/Q channel separator is provided to separate the receive signal carried at the intermediate frequency into an analog in-phase (I) signal in an I channel and an analog quadrature-phase (Q) in a Q channel. An analog-to-digital (A/D) converter is provided to respectively convert the I signal and the Q signal to digital domain representations of the I signal and the Q signal. An intermodulation (IM) distortion avoider is provided to avoid IM distortion in the receive signal. The IM distortion avoider includes a carrier frequency exchanger to exchange an IM carrier frequency of IM distortion contained in the receive signal with a carrier frequency of the receive signal.

35 Claims, 5 Drawing Sheets

U.S. PATENT DOCUMENTS

| | | | |
|---|---|---|---|
| 2002/0051497 A1* | 5/2002 | Breems et al. | 375/261 |
| 2002/0098820 A1* | 7/2002 | Dijkmans et al. | 455/303 |
| 2003/0174090 A1 | 9/2003 | Spilker, Jr. et al. | |
| 2004/0158678 A1 | 8/2004 | Chen | |
| 2004/0177723 A1 | 9/2004 | Van Daam et al. | |
| 2005/0059364 A1 | 3/2005 | Hansen et al. | |
| 2005/0094750 A1 | 5/2005 | Park et al. | |
| 2005/0170805 A1* | 8/2005 | Hammes et al. | 455/255 |
| 2005/0195920 A1 | 9/2005 | Gierl et al. | |
| 2005/0265485 A1* | 12/2005 | Robinson | 375/322 |
| 2006/0068745 A1 | 3/2006 | Wei | |
| 2007/0093227 A1 | 4/2007 | Lieback et al. | |

FOREIGN PATENT DOCUMENTS

| | | |
|---|---|---|
| DE | 10042959 | 1/2002 |
| EP | 1111772 | 6/2001 |
| EP | 1154589 A2 | 11/2001 |
| EP | 1199796 | 4/2002 |
| GB | 2338853 | 12/1999 |
| JP | 2001274714 A | 10/2001 |
| JP | 2001358630 A | 12/2001 |
| JP | 2005260720 A | 9/2005 |
| WO | WO2005050940 A1 | 6/2005 |

OTHER PUBLICATIONS

Written Opinion, PCT/US2007/085296—International Search Authority—European Patent Office—Nov. 4, 2008.

Translation of Office Action in Japanese application 2008-554532 corresponding to U.S. Appl. No. 11/352,495, citing JP2005260720, JP2001274714 and JP2001358630 dated Feb. 1, 2011.

Taiwan Search Report—TW096144148—TIPO—May 17, 2011.

* cited by examiner

FREQUENCY CHANGER CIRCUITS

RELATED APPLICATION

This application is related to the following co-pending U.S. patent application numbers: application Ser. No. 11/352,495, filed Feb. 10, 2006, entitled Conversion of Multiple Analog Signals in an Analog to Digital Converter.

COPYRIGHT NOTICE

This patent document may contain information subject to copyright protection. The copyright owner has no objection to the facsimile reproduction by anyone of the patent document or the patent, as it appears in the US Patent and Trademark Office files or records, but otherwise reserves all copyright rights whatsoever.

BACKGROUND OF THE DISCLOSURE

The present disclosure is related to frequency changer circuits, for example, in a mobile communications device. The mobile communications device may include receive and transmit channels for mobile communications, for example, of voice and/or data in a mobile phone, and/or the mobile communications device may include GPS circuitry.

Mobile communications devices typically include transmitters and receivers. The transmitter generates a signal, for example, carried at baseband, and modulates that signal so that the signal can be transmitted at a higher radio frequency (RF) carrier frequency. For example, the RF carrier frequency of a transmit signal of a CDMA mobile phone may be at 835 MHz. A receiver receives a receive signal at an RF carrier frequency unique to the receive signal (e.g., at 880 MHz for CDMA), and modulates that signal by changing its carrier frequency to a lower frequency, e.g., to an intermediate (IF) frequency and/or to baseband. A mobile communications device may further include a global positioning system (GPS) receiver to receive GPS signals. The GPS receiver receives a GPS signal at an RF carrier frequency unique to the GPS signal, and changes the carrier frequency of the received GPS signal to a lower frequency, for example, to an IF frequency and/or to baseband.

BRIEF SUMMARY OF THE DISCLOSURE

In accordance with one aspect of the disclosure, apparatus are provided. A filter is provided to receive from an antenna a receive signal of a given type and a low noise amplifier is provided to amplify the received signal. A translator down translates the receive signal carried at a radio frequency to be carried at an intermediate frequency. An I/Q channel separator is provided to separate the receive signal carried at the intermediate frequency into an analog in-phase (I) signal in an I channel and an analog quadrature-phase (Q) in a Q channel. An analog-to-digital (A/D) converter is provided to respectively convert the I signal and the Q signal to digital domain representations of the I signal and the Q signal. An intermodulation (IM) distortion avoider is provided to avoid IM distortion in the receive signal. The IM distortion avoider includes a carrier frequency exchanger to exchange an IM carrier frequency of IM distortion contained in the receive signal with a carrier frequency of the receive signal.

In accordance with one aspect of the disclosure, the IM distortion avoider may include an I/Q sampler to sample and hold I and Q values at a given sample rate and an I/Q value interchanger to interchange I values in the I channel with Q values in the Q channel. This causes the IM carrier frequency to change from baseband to an IF frequency and further causes the receive signal carrier frequency to change from the IF frequency to baseband.

BRIEF DESCRIPTION OF THE DRAWINGS

Embodiments of the present disclosure are further described in the detailed description, which follows, by reference to the noted drawings, in which like reference numerals represent similar parts throughout the several views of the drawings, and wherein.

DETAILED DESCRIPTION

Figure 1:
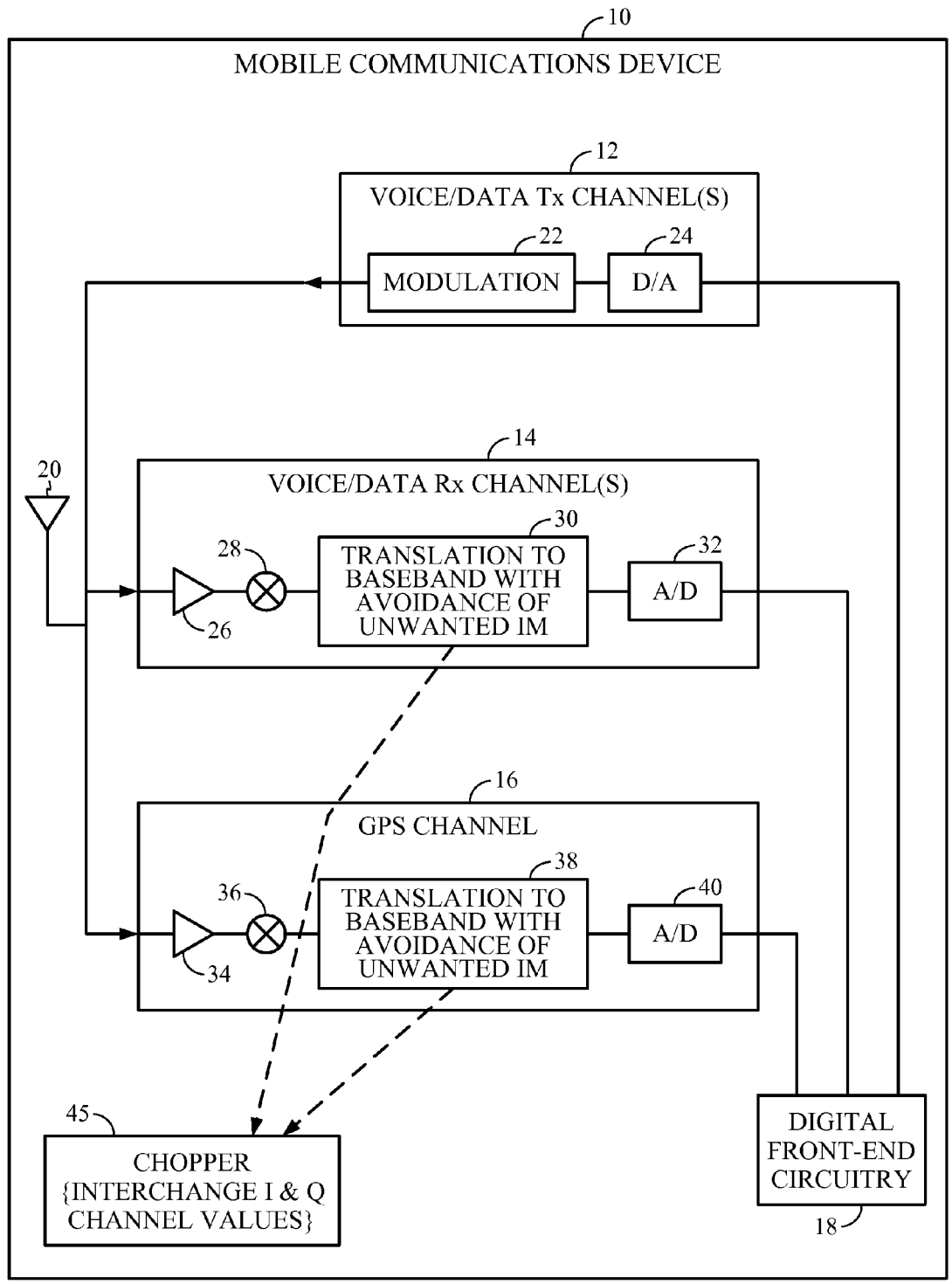
FIG. 1 is a schematic diagram of a mobile communications device.

Referring now to the drawings in greater detail, FIG. 1 shows a mobile communications device 10, which may, for example, include a mobile phone. The illustrated mobile communications device 10 includes one or more voice and/or data transmit channels 12, one or more voice/data receive channels 14, a GPS receive channel 16, and digital front-end circuitry 18. Each of the illustrated transmit, receive, and GPS channels 12, 14, and 16 is connected to an antenna 20. Antenna 20 may be connected to receive channels 14 and 16 by a diplexer (not shown) and a respective surface acoustic wave (SAW) filter (not shown) for each such receive channel. One antenna is shown in the mobile communications device 10 illustrated in FIG. 1, which is shared by the transmit channel and each of the receive channels. Additional antennas could be provided in a mobile communications device. For example, separate antennas may be provided for each of the channels, or one or more separate antennas may be provided in order to implement some sort form of antenna diversity. The illustrated transmit channel (or channels) 12 generally includes a modulation circuit 22 and a digital-to-analog (D/A) converter 24.

Voice/data receive channel 14 includes, as illustrated, a low noise amplifier 26 connected in sequence to a mixer 28, to a translator circuit 30, and to an A/D converter 32. GPS channel 16 includes a low noise amplifier 34, a mixer 36, a translator 38, and an A/D converter 40. In each of the receive channels 14 and 16, the translator circuit includes a mechanism for translating the receive signal to baseband while avoiding the effects of unwanted intermodulation in the receive signal. These channels may receive GSM, CDMA, or WCDMA waveforms.

In the embodiment shown in FIG. 1, each of the translator circuits 30 and 38 includes a chopper 45. The chopper 45 causes an interchange of in-phase (I) and quadrature-phase (Q) channel values in order to cause the translation of the receive signal from an intermediate frequency (IF) to baseband, while facilitating the avoiding of unwanted intermodulation (IM) components in the receive signal. This will be further described below.

The outputs of each of the A/D converters 32 and 40 are provided to a digital front-end circuitry 18, which routes sound and data from the receive signals for output, for example, via a speaker (not shown) and a visual display (not shown). Front-end circuitry also handles, e.g., digital signal processing functions, and the control and general operation of the communications device.

Figure 2:
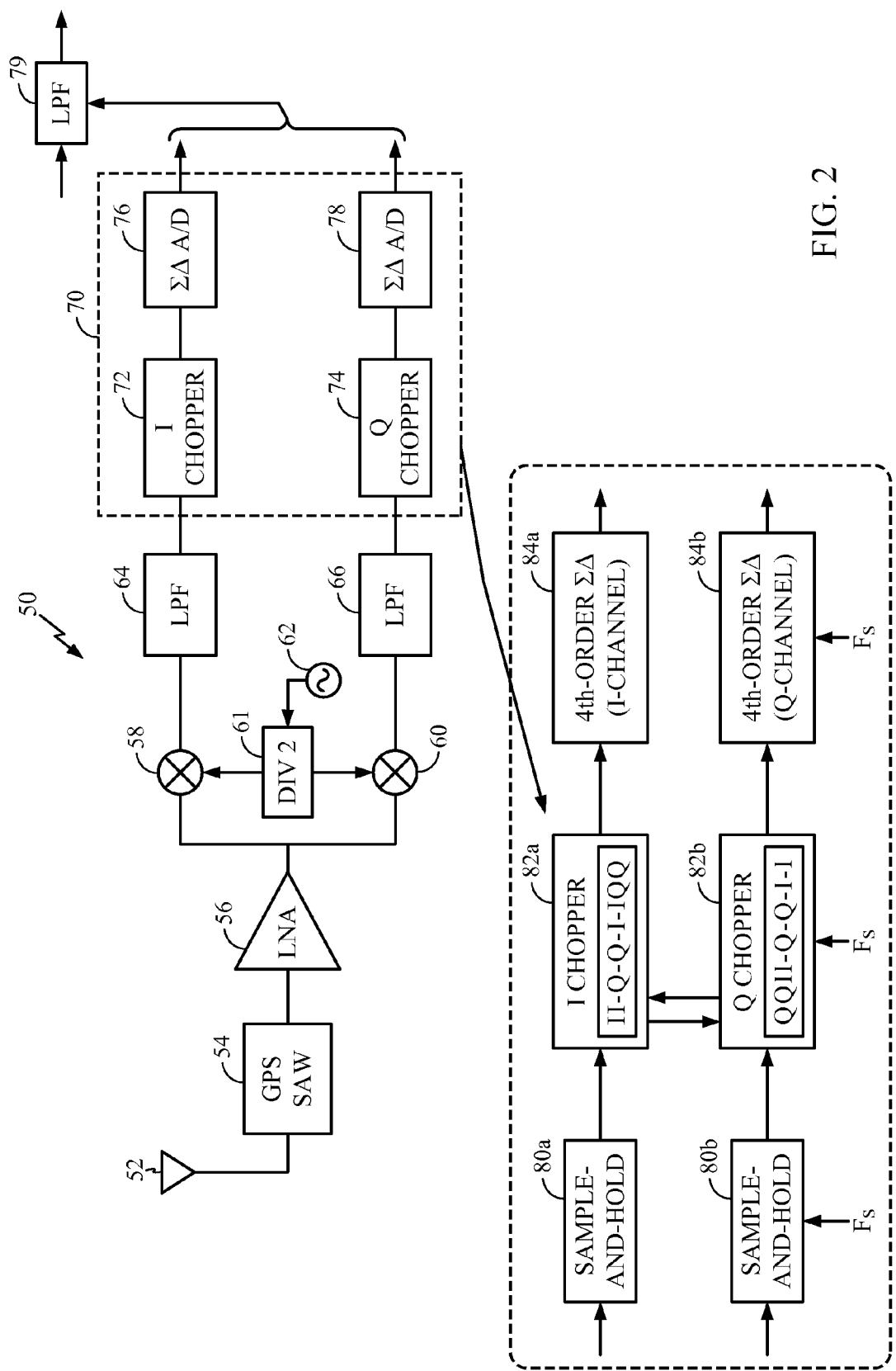
FIG. 2 is a schematic diagram of a GPS channel that may be provided in the device in FIG. 1.

FIG. 2 is a schematic diagram of a GPS receive channel 50. The illustrated channel 50 includes an antenna 52 connected to a GPS SAW 54, which is in turn connected to a low noise amplifier 56. The output of the low noise amplifier 56 is coupled to an I/Q channel separator to separate the receive signal into an analog I channel which goes into an I channel mixer 58 and an analog Q channel which goes into a Q channel mixer 60. I channel mixer 58 and Q channel mixer 60 may each be driven by an oscillating signal which has a frequency equal to one-half the frequency of an oscillating signal provided by a local oscillator 62. A person of ordinary skill in the art will recognize that there are other ways to change the incoming bitstream into I and Q channels. In the illustrated embodiment, the signal output by low noise amplifier 56 is a GPS signal at a carrier frequency of 1,575 MHz, and the frequency of the local oscillator 62 is 1,570 MHz. Accordingly, the IF carrier frequency of the I and Q channel signals output by each of mixers 58 and 60 is at about 5 MHz. Each of the I and Q channel signals is respectively input into a low pass filter 64 and 66, and the output signals of those low pass filters are then input into chopper circuitry 70. Chopper circuitry 70 includes an I chopper 72 which outputs a signal into an analog to digital converter 76, and a Q chopper 74, which outputs a signal input into an analog to digital converter 78.

Chopper circuitry 70 is shown in more detail in a lower part of FIG. 2. The illustrated chopper circuitry 70 includes, for the I channel, sample-and-hold circuitry 80a, and for the Q channel, sample-and-hold circuitry 80b. Accordingly, the I channel signal output by low pass filter 64 is input into sample-and-hold circuit 80a, and the sample-and-held signal is output into I chopper 82a. This stream of values is then input in sequence to the I and Q channel A/D converters 84a and 84b.

The illustrated chopper circuitry serves as an intermodulation (IM) distortion avoider to avoid IM distortion in the Rx signal. The illustrated circuitry does this by including a carrier frequency exchanger to exchange an IM carrier frequency of IM distortion contained in the Rx signal with a carrier frequency of the Rx signal. The IM carrier frequency is changed from baseband to an IF frequency, and the Rx signal carrier frequency is changed from the IF frequency to baseband.

More specifically, e.g., as shown in FIG. 2, the IM distortion avoider may include an I/Q sampler (e.g., sample-and-hold circuits 80a and 80b) to sample and hold I and Q values at a given sample rate and an I/Q value interchanger (e.g., I and Q choppers 82a and 82b) to interchange I values in the I channel with Q values in the Q channel, to thereby cause the IM carrier frequency to change from baseband to an IF frequency and to thereby cause the Rx signal carrier frequency to change from the IF frequency to baseband.

In the sample-and-hold circuits 80a and 80b shown in FIG. 2, the I and Q values are sampled at a sample rate equal to an integer multiple (N=8 in one embodiment) of the IF frequency of the receive signal (5 MHz in one embodiment). Accordingly, in one example embodiment, the sample rate may be 8×5 MHz=40 MHz.

The I/Q value interchanger circuitry (e.g., I and Q choppers 82a and 82b in the illustrated embodiment) and the subsequent A/D converters 84a and 84b may be clocked with the same sample frequency (Fs) signal as used for the sample-and-hold circuits 80a and 80b.

In the embodiment shown in FIG. 2, the I chopper 82a changes its I values to a sequence of revised I values (I') in accordance with the pattern I, I, −Q, −Q, −I, −I, Q, Q, repeat. Thus, at a time t0, a sampled I value I(t0) (output by I sample-and-hold circuit 80a) is the I' value output in the output stream of I chopper 82a. At a time t1 (1/Fs seconds later), the I' value is I(t1). At a time t2 (1/Fs seconds after t1), the I value is the inverse of the sampled value Q(t2), i.e., −Q(t2). The I' values output by the I chopper are determined in this manner by continuing to follow the pattern shown in FIG. 2 for the I chopper.

In embodiment shown in FIG. 2, the Q chopper 82b changes its Q values to a sequence of revised Q values (Q') in accordance with the pattern Q, Q, I, I, −Q, −Q, −I, −I, repeat. Thus, at a time t0, a sampled Q value Q(t0) (output by Q sample-and-hold circuit 80b) is the Q' value output in the output stream of Q chopper 82b. At a time t1 (1/Fs seconds later), the Q' value is Q(t1). At a time t2 (1/Fs seconds after t1), the Q' value is the sampled value I(t2). The Q' values output by the Q chopper are determined in this manner by continuing to follow the pattern shown in FIG. 2 for the Q chopper.

A few example alternate patterns (among others not expressly mentioned herein) for the I and Q channels include, e.g., for I': I, −Q, −I, Q, repeat and for Q': Q, I, −Q, −I, repeat; or for I': I, I, I, I, −Q, −Q, −Q, −Q, −I, −I, −I, −I, Q, Q, Q, Q, repeat, and for Q': Q, Q, Q, Q, I, I, I, I, −Q, −Q, −Q, −Q, −I, −I, −I, −I, repeat. The patterns between channels are offset by 90 degrees in phase. In addition, the increased number of consecutive samples before the pattern repeats has a lower frequency. For example, I, I, I, I, −Q, −Q, −Q, −Q, −I, −I, −I, −I, Q, Q, Q, Q, repeat, has a lower frequency than the pattern: I, −Q, −I, Q, repeat.

Figure 3:
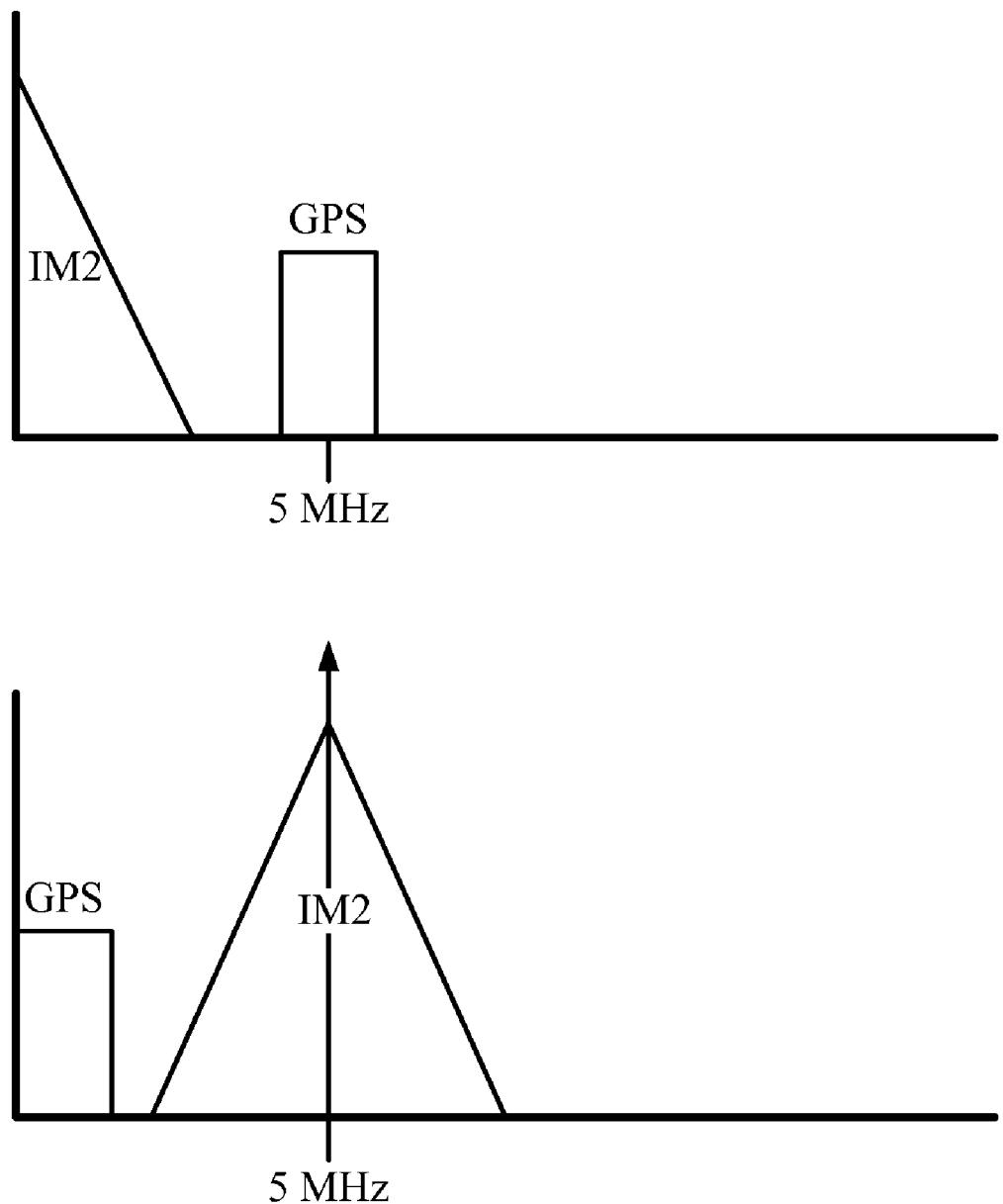
FIG. 3 shows frequency domain waveforms of a receive signal before and after being processed by a chopper.

As noted above, upon passing the I and Q sample values through the chopper circuitry, the IM carrier frequency is changed from baseband to an IF frequency, and the Rx signal carrier frequency is changed from the IF frequency to baseband. As shown in FIG. 2, with a sample frequency Fs of 40 MHz, and an IF frequency (carrying the analog I and Q signals) of 5 MHz, and with the I and Q signals carrying parts of a QPSK GPS signal, this moves the second order intermodulation (IM2) distortion components in both the I and Q channels from baseband (as shown in the top waveform of FIG. 3) to 5 MHz (as shown in the bottom waveform of FIG. 3). Meanwhile, the GPS signal is moved from 5 MHz (as shown in the top waveform of FIG. 3) to baseband (as shown in the bottom waveform of FIG. 3). Using chopper circuitry 70 in the above described manner allows for complex mixing, also called complex chopping, resulting in a single-side band waveform at baseband.

Subsequent to the A/D converters 76 and 78, a digital domain low pass filter 79 may be applied to filter out the now upshifted IM component and other higher frequency image signals.

Figure 4:
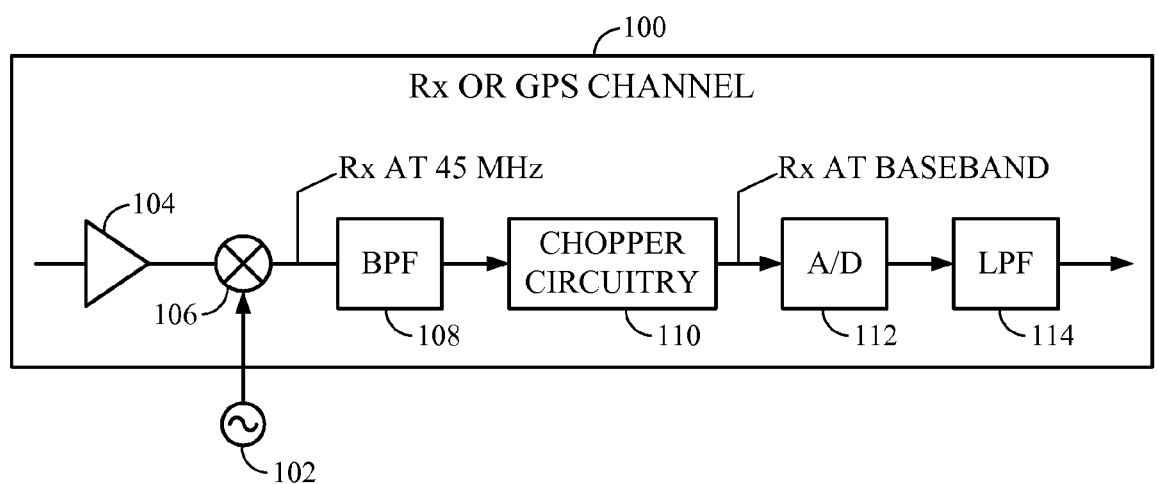
FIG. 4 is a block diagram of a receive or GPS channel including a chopper circuit.
Figure 5:
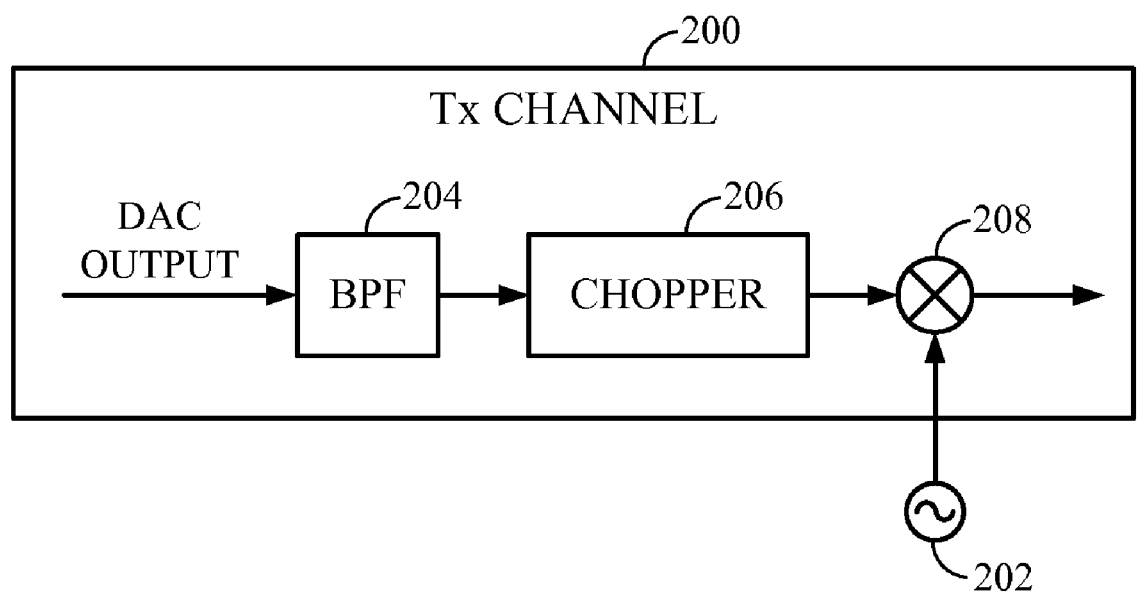
FIG. 5 is a block diagram of a transmit channel including a chopper circuit.

FIGS. 4 and 5 are schematic diagrams of channels of a mobile communications device in accordance with another embodiment. A given mobile communications device may have receive and transmit channels, at least one local oscillator provided for mixers of both the receive channel and the transmit channel, and a signal frequency changer. The receive and transmit channels may, e.g., carry GSM, CDMA or WCDMA signals or other mobile data/voice protocol signals. In addition, the receive channel may be a GPS receive channel. The signal frequency changer may be provided to adjust a carrier frequency in a given channel, without using a local oscillator. The signal frequency changer includes an I/Q sampler to sample and hold I and Q values of the given channel at a given sample rate. For example, the sample rate Fs (e.g., 40 MHz) may be an integer value N (e.g., 8) multiplied by an IF frequency of the analog I and Q channel signals (e.g., 5 MHz). The signal frequency changer further includes an I/Q value interchanger to interchange I values in an I channel of the given channel with Q values in a Q channel of the given channel. This may be accomplished with chopper circuitry, e.g., as described above with respect to FIG. 2.

FIG. 4 shows a receive channel 100. In this embodiment, the receive channel 100 performs mixing using a local oscillator 102 provided for (or in) the transmit channel.

The illustrated receive channel 100 includes a low noise amplifier 104 connected to an RF to IF frequency change mixer 106. The output of mixer 106 is connected to a band pass filter (BPF) 108. The output of BPF 108 is connected to chopper circuitry 110, which is in turn connected to an A/D converter 112. A digital domain low pass filter 114 is connected to the output of A/D converter 112. For simplification, the elements depicted in FIG. 4 do not show the separation of the I and Q channels.

In operation, the receive channel 100 may receive at its input (to LNA 104) a receive signal at a receive RF frequency (e.g., at 880 MHz for a CDMA receive signal). Mixer 106 down-shifts the receive carrier frequency from this RF frequency to an IF frequency (e.g., 40 MHz), by multiplying the input signal by a local oscillator signal from the transmit channel (e.g., such local oscillator having a frequency equal to the transmit RF frequency of 840 MHz).

BPF 108 is applied to allow the receive frequency now at the IF frequency to pass, while filtering out other unwanted signal components (e.g., an intermodulation component from the transmit channel which is at baseband upon the operation of mixer 106).

Chopper circuitry 110 operates on the I and Q channel analog signals, to cause the receive signal to be down-shifted from the IF frequency to baseband. Digitial domain low pass filter 114 further filters out any image or other higher frequency unwanted signal components from the composite receive signal.

FIG. 5 shows a transmit channel 200. In this embodiment, the transmit channel 200 performs mixing using a local oscillator 202 provided for (or in) the receive channel.

The illustrated transmit channel 200 includes a DAC output which outputs a transmit signal at baseband. The DAC output is connected to a bandpass filter (BPF) 204, which is in turn connected to a chopper 206, before the signal is input to a mixer 208.

For simplification, the elements depicted in FIG. 4 do not show the separation of the I and Q channels, which occurs before processing by chopper 206.

BPF 204 applies a bandpass filtering operation on the transmit signal which is now at baseband, to output a transmit signal without image signals or unwanted higher frequency components.

Chopper circuitry 206 operates on the I and Q channel analog signals, to cause the transmit signal to be up-shifted from baseband to the IF frequency.

Mixer 108 up-shifts the transmit carrier frequency from IF frequency caused by chopper 206 (e.g., −40 MHz), by multiplying the input signal by a local oscillator signal from the receive channel (e.g., such local oscillator having a frequency equal to the transmit RF frequency of 880 MHz).

In this embodiment, since the receive RF frequency is 880 MHz (and accordingly, the associated local oscillator of the receive channel is also at 880 MHz), while the desired upshifted transmit RF frequency is 840 MHz, chopper circuitry 206 is configured so that it shifts the transmit signal from baseband to −40 MHz (instead of to +40 MHz). This is done by complex chopping, producing a single-sideband.

The processing performed by each of the elements shown in the figures herein may be performed by a general purpose computer, and/or by a specialized processing computer. Such processing may be performed by a single platform, by a distributed processing platform, or by separate platforms. In addition, such processing can be implemented in the form of special purpose hardware, or in the form of software being run by a general purpose computer. Any data handled in such processing or created as a result of such processing can be stored in any type of memory. By way of example, such data may be stored in a temporary memory, such as in the RAM of a given computer system or subsystems. In addition, or in the alternative, such data may be stored in longer-term storage devices, for example, magnetic discs, rewritable optical discs, and so on. For purposes of the disclosure herein, machine-readable media may comprise any form of data storage mechanism, including such memory technologies as well as hardware or circuit representations of such structures and of such data. The processes may be implemented in any machine-readable media and/or in an integrated circuit.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example may arise from applicants/patentees, and others.

What is claimed is:

1. Apparatus comprising:
   a filter to receive from an antenna a receive (Rx) signal of a given type and a low noise amplifier to amplify the Rx signal;
   a translator to down translate the Rx signal carried at a radio frequency to be carried at an intermediate frequency;
   an I/Q channel separator to separate the Rx signal carried at the intermediate frequency into an analog in-phase (I) signal in an I channel and an analog quadrature-phase (Q) signal in a Q channel;
   an analog-to-digital converter to respectively convert the I signal and the Q signal to digital domain representations of the I signal and the Q signal; and
   an intermodulation (IM) distortion avoider to avoid IM distortion in the Rx signal, the IM distortion avoider including a carrier frequency exchanger to exchange an IM carrier frequency of IM distortion contained in the Rx signal with a carrier frequency of the Rx signal.

2. The apparatus according to claim 1, wherein the filter includes a surface wave acoustic filter.

3. The apparatus according to claim 1, wherein the receive signal includes a QPSK signal.

4. The apparatus according to claim 1, wherein the receive signal includes a global positioning system (GPS) signal.

5. The apparatus according to claim 4, wherein the receive signal further includes a mobile phone signal.

6. The apparatus according to claim 5, wherein the mobile phone signal includes a CDMA signal.

7. The apparatus according to claim 5, wherein the mobile phone signal includes a WCDMA signal.

8. The apparatus according to claim 1, wherein the translator includes a mixer.

9. The apparatus according to claim 1, wherein the IM distortion includes an IM2 component.

10. The apparatus according to claim 1, wherein the IM distortion includes a transmit image signal.

11. The apparatus according to claim 1, wherein the IM distortion avoider includes an I/Q sampler to sample and hold I and Q values at a given sample rate and an I/Q value interchanger to interchange I values in the I channel with Q values in the Q channel, to thereby cause the IM carrier frequency to change from baseband to an IF frequency and to thereby cause the Rx signal carrier frequency to change from the IF frequency to baseband.

12. The apparatus according to claim 11, further comprising a low pass filter to filter out the IM distortion at the IF frequency.

13. The apparatus according to claim 12, wherein the low pass filter includes a digital domain low pass filter.

14. The apparatus according to claim 12, wherein the I/Q value interchanger includes an I chopper and a Q chopper.

15. Apparatus comprising:
a receive channel to receive a receive (Rx) signal, and to carry the Rx signal in separate analog I and Q channels at an IF frequency, wherein the Rx signal comprises IM distortion;
a transmit channel to transmit a transmit (Tx) signal, and to carry the Tx signal in separate analog I and Q channels at an IF frequency; and
a signal frequency changer to adjust a carrier frequency in a given channel, the given channel including at least one of the receive channel and the transmit channel, without using a local oscillator, the signal frequency changer including an I/Q sampler to sample and hold I and Q values of the given channel at a given sample rate and an I/Q value interchanger to interchange I values in an I channel of the given channel with Q values in a Q channel of the given channel to cause an IM carrier frequency of the IM distortion to change to the IF frequency of the Rx signal.

16. The apparatus according to claim 15, wherein the receive channel and the transmit channel are mobile phone channels.

17. The apparatus according to claim 16, wherein the receive channel further includes a GPS channel.

18. The apparatus according to claim 15, wherein the receive and transmit signals are CDMA signals.

19. The apparatus according to claim 15, wherein the receive and transmit signals are WCDMA signals.

20. The apparatus according to claim 15, further comprising a local oscillator, local to a communications device containing both the receive channel and the transmit channel, for mixers in both the receive channel and the transmit channel.

21. Apparatus comprising:
means for receiving from an antenna a receive (Rx) signal of a given type;
means for amplifying the Rx signal;
means for down translating the Rx signal carried at a radio frequency to be carried at an intermediate frequency;
means for separating the Rx signal carried at the intermediate frequency into an analog in-phase (I) signal in an I channel and an analog quadrature-phase (Q) signal in a Q channel;
means for respectively converting the I signal and the Q signal to digital domain representations of the I signal and the Q signal; and
means for avoiding IM distortion in the Rx signal, the means for avoiding including means for exchanging an IM carrier frequency of IM distortion contained in the Rx signal with a carrier frequency of the Rx signal.

22. The apparatus according to claim 21, wherein the means for avoiding include means for sampling and holding I and Q values at a given sample rate and means for interchanging I values in the I channel with Q values in the Q channel, to thereby cause the IM carrier frequency to change from baseband to an IF frequency and to thereby cause the Rx signal carrier frequency to change from the IF frequency to baseband.

23. The apparatus according to claim 22, further comprising a low pass filter to filter out the IM distortion at the IF frequency.

24. The apparatus according to claim 23, wherein the low pass filter includes a digital domain low pass filter.

25. Apparatus comprising:
means for receiving a receive (Rx) signal, and for carrying the Rx signal in separate analog I and Q channels at an IF frequency, wherein the Rx signal comprises IM distortion;
means for transmitting a transmit (Tx) signal, and for carrying the Tx signal in separate analog I and Q channels at an IF frequency; and
means for adjusting a carrier frequency in a given channel, the given channel including at least one of the receive channel and the transmit channel, without using a local oscillator, the means for adjusting including means for sampling and holding I and Q values of the given channel at a given sample rate and means for interchanging I values in an I channel of the given channel with Q values in a Q channel of the given channel to cause an IM carrier frequency of the IM distortion to change to the IF frequency of the Rx signal.

26. The apparatus according to claim 25, further comprising a local oscillator, local to a communications device containing both the receive channel and the transmit channel, for mixers in both the means for receiving and the means for transmitting.

27. A method comprising:
receiving from an antenna a receive (Rx) signal of a given type and amplifying the Rx signal;
down translating the Rx signal carried at a radio frequency to be carried at an intermediate frequency;
separating the Rx signal carried at the intermediate frequency into an analog in-phase (I) signal in an I channel and an analog quadrature-phase (Q) signal in a Q channel;
respectively converting the I signal and the Q signal to digital domain representations of the I signal and the Q signal; and
avoiding IM distortion in the Rx signal, the avoiding including exchanging an IM carrier frequency of IM distortion contained in the Rx signal with a carrier frequency of the Rx signal.

28. The method according to claim 27, wherein the avoiding includes sampling and holding I and Q values at a given sample rate and interchanging I values in the I channel with Q values in the Q channel, to thereby cause the IM carrier frequency to change from baseband to an IF frequency and to thereby cause the Rx signal carrier frequency to change from the IF frequency to baseband.

29. A method comprising:
receiving a receive (Rx) signal, and carrying the Rx signal in separate analog I and Q channels at an IF frequency, wherein the Rx signal comprises IM distortion;
transmitting a transmit (Tx) signal, and carrying the Tx signal in separate analog I and Q channels at an IF frequency; and
adjusting a carrier frequency in a given channel, the given channel including at least one of a receive channel and a transmit channel, without using a local oscillator, the adjusting including sampling and holding I and Q values of the given channel at a given sample rate and an I/Q value interchanger to interchange I values in an I channel of the given channel with Q values in a Q channel of the given channel to cause an IM carrier frequency of the IM distortion to change to the IF frequency of the Rx signal.

30. An integrated circuit comprising:
a semiconductor substrate;
on the substrate, a filter to receive from an antenna a receive (Rx) signal of a given type and a low noise amplifier to amplify the Rx signal;
on the substrate, a translator to down translate the Rx signal carried at a radio frequency to be carried at an intermediate frequency;
on the substrate, an I/Q channel separator to separate the Rx signal carried at the intermediate frequency into an analog in-phase (I) signal in an I channel and an analog quadrature-phase (Q) signal in a Q channel;
on the substrate, an analog-to-digital converter to respectively convert the I signal and the Q signal to digital domain representations of the I signal and the Q signal; and
on the substrate, an intermodulation (IM) distortion avoider to avoid IM distortion in the Rx signal, the IM distortion avoider including a carrier frequency exchanger to exchange an IM carrier frequency of IM distortion contained in the Rx signal with a carrier frequency of the Rx signal.

31. The integrated circuit according to claim 30, wherein the IM distortion avoider includes an I/Q sampler to sample and hold I and Q values at a given sample rate and an I/Q value interchanger to interchange I values in the I channel with Q values in the Q channel, to thereby cause the IM carrier frequency to change from baseband to an IF frequency and to thereby cause the Rx signal carrier frequency to change from the IF frequency to baseband.

32. An integrated circuit comprising:
a semiconductor substrate;
on the substrate, a receive channel to receive a receive (Rx) signal, and to carry the Rx signal in separate analog I and Q channels at an IF frequency, wherein the Rx signal comprises IM distortion;
on the substrate, a transmit channel to transmit a transmit (Tx) signal, and to carry the Tx signal in separate analog I and Q channels at an IF frequency; and
on the substrate, a signal frequency changer to adjust a carrier frequency in a given channel, the given channel including at least one of the receive channel and the transmit channel, without using a local oscillator, the signal frequency changer including an I/Q sampler to sample and hold I and Q values of the given channel at a given sample rate and an I/Q value interchanger to interchange I values in an I channel of the given channel with Q values in a Q channel of the given channel to cause an IM carrier frequency of the IM distortion to change to the IF frequency of the Rx signal.

33. A computer-readable medium comprising:
code for causing a computer to receive (Rx) a signal of a given type from an antenna and amplifying the Rx signal;
code for causing the computer to down translate the Rx signal carried at a radio frequency to be carried at an intermediate frequency;
code for causing the computer to separate the Rx signal carried at the intermediate frequency into an analog in-phase (I) signal in an I channel and an analog quadrature-phase (Q) signal in a Q channel;
code for causing the computer to respectively convert the I signal and the Q signal to digital domain representations of the I signal and the Q signal; and
code for causing the computer to avoid IM distortion in the Rx signal, the avoid includes exchanging an IM carrier frequency of IM distortion contained in the Rx signal with a carrier frequency of the Rx signal.

34. The computer-readable medium according to claim 33, further comprising the code for causing the computer to avoid including sample and hold I and Q values at a given sample rate and interchanging I values in the I channel with Q values in the Q channel, to thereby cause the IM carrier frequency to change from baseband to an IF frequency and to thereby cause the Rx signal carrier frequency to change from the IF frequency to baseband.

35. A computer-readable medium comprising:
code for causing a computer to receive a receive (Rx) signal, and carrying the Rx signal in separate analog I and Q channels at an IF frequency, wherein the Rx signal comprises IM distortion;
code for causing a computer to transmit a transmit (Tx) signal, and carrying the Tx signal in separate analog I and Q channels at an IF frequency; and
code for causing a computer to adjust a carrier frequency in a given channel, the given channel including at least one of a receive channel and a transmit channel, without using a local oscillator, the adjust includes sample and hold I and Q values of the given channel at a given sample rate and interchanging I values in an I channel of the given channel with Q values in a Q channel of the given channel to cause an IM carrier frequency of the IM distortion to change to the IF frequency of the Rx signal.

* * * * *